2 Sheets—Sheet 1.
A. MANG.
Orrery.
No. 215,948.        Patented May 27, 1879.
Fig. 1
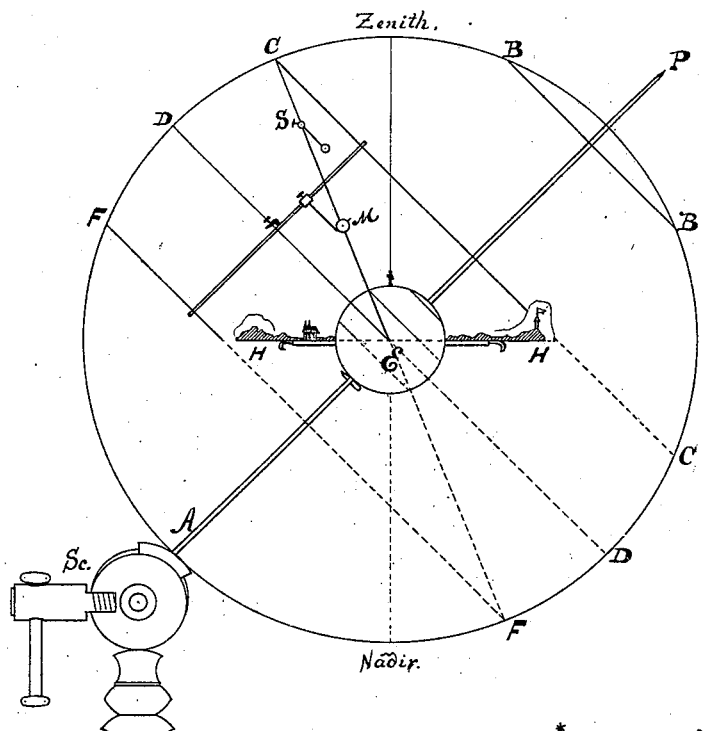
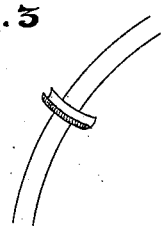
Fig. 3
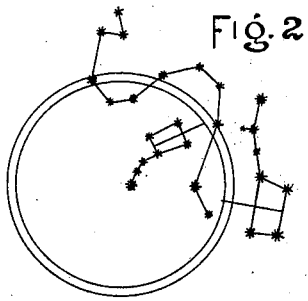
Fig. 2
WITNESSES:                INVENTOR:

2 Sheets—Sheet 2.
A. MANG.
Orrery.
No. 215,948. Patented May 27, 1879.
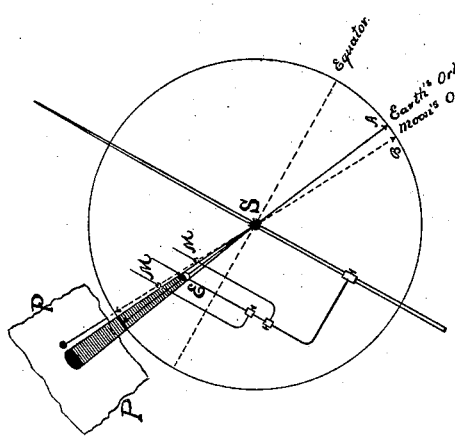
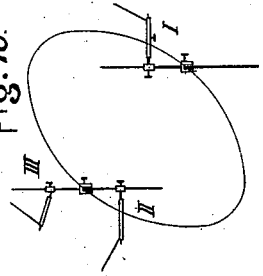
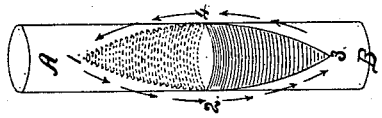
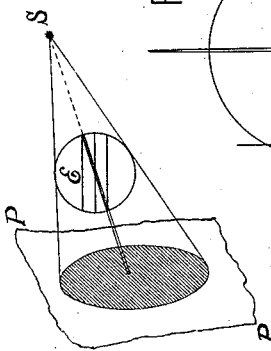
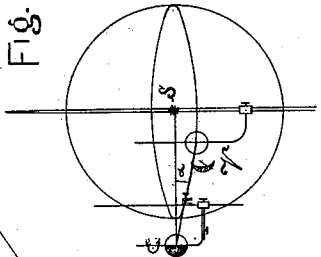
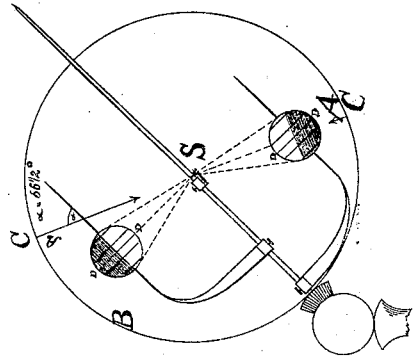
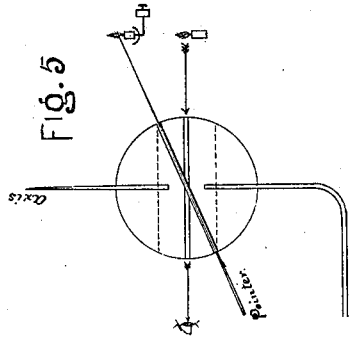
WITNESSES:
O. W. Bond
H. F. Burns
INVENTOR:
Adolf Mang
by his attorney
Thomas D. Stetson

UNITED STATES PATENT OFFICE.

ADOLF MANG, OF BADEN-BADEN, GERMANY.

IMPROVEMENT IN ORRERIES.

Specification forming part of Letters Patent No. 215,948, dated May 27, 1879; application filed July 25, 1878.

*To all whom it may concern:*

Be it known that I, ADOLF MANG, of Baden-Baden, Germany, have invented certain new and useful Improvements in Orreries, of which the following is a full specification, reference being had to the accompanying drawings, and to the letters of reference marked thereon.

According to Humboldt, Madler, and others, the best method is to proceed from appearances conformable to nature, and to show afterward the correctness of actual movements. The apparatuses at present in use explain only a few motions, and place the ecliptic horizontally for all purposes. This tends to produce an erroneous idea, having no connection with local appearance.

There are apparatuses which show apparent motions; but all such known are very complicated and expensive, so that few, if any, are now in use at any but the highest institutions.

The following is a description of what I consider the best means of carrying out my invention, reference being had to the accompanying drawings, in which—

Figure 1 is a side elevation of the apparatus, showing the heavens, with the earth as the central object. Fig. 2 is a view of a detachable ring, with certain constellations attached thereto. Fig. 3 shows the means used to secure the said ring on the globe of the heavens. Fig. 4 shows the actual movement of the earth, illustrating the four seasons. Figs. 5 and 6 show the earth perforated, the better to illustrate certain phenomena. Fig. 7 represents the provisions on the axis to automatically guide the motion of the earth. Fig. 8 shows the mode of representing the phenomena of eclipses. Fig. 9 shows the mode of representing the relative positions of the planets and the earth. Fig. 10 shows the set-screws to secure various parts of the apparatus adjustably together.

The apparatus is a globe of the heavens, of convenient size and movable. If the round horizontal plate which is placed temporarily in the center is taken out, and a lighted candle placed about two inches below the axis, it shows the polar projection of the northern heaven by the shade of the devices representing lines and stars thrown up to the ceiling of the room. (Not represented, except a small portion in Fig. 8.) A map can be thus made about sixteen feet in diameter by my apparatus, which may be about two feet in diameter. It shows the origin of the maps of the heavens. This is one use of this instrument.

To explain the apparent motion of the sun, suppose the city of Philadelphia be chosen for example. The polar star stands there forty degrees above the horizon; therefore the axis of the heavens makes this angle with it. The axis is easily inclined to this angle to the north and the horizontal plate beveled afterward.

The oblique ring represents the annual orbit of the sun, and the screw with the pin fastened to the ring is the holder of the sun. This last may be a small lighted candle. If this is fastened at any point of the ecliptic or the orbit of the sun in such a way that the holder remains in the plane of the ecliptic, different cutting-points of the horizon with the sun will be made by the rotation of the wire apparatus—that is, every possible rising and setting of the sun resulting therefrom will be distinctly indicated.

A further use is to represent certain regions by pasteboard or other similar material, and to border it with red tissue-paper. By this mode may be made more than twenty different kinds of illuminations, and a brilliant morning and evening red; also the phenomena of the gradual rising and setting of the sun, resembling the natural spectacle.

It is also practicable to place the moon at any point in the heavens through which it ever revolves, and every motion of it can be shown by this simple method of fastening; but it must always be screwed on the equator of the heavens.

If it is necessary to show the apparent origin of the phases of the moon, it may be screwed inside and the sun outside of the globe.

Finally, all phenomena in regard to the poles, the equator, and every other place can be imitated, the three necessary conditions being at hand—viz., the relative motions of the axis of the heaven, that of the horizon, and also of the wire basis itself. If the axis and the horizon are placed level, the phenomena of the equator result.

The motions stated are brought to light by the simplest imaginable mode. The globe of the heavens is not held, as usual, by a gradation-ring, which, by reason of its broad shade, would prevent any composition of a map of stars by shadows. It turns easily and freely about the axis.

The gradation, the constellation of the stars, and the names of the months are placed temporarily merely as marks, and do not disturb the view of the phenomena produced.

I can affix the constellations of the milky way and others at the polar and tropical circles, and provide the same with clamps, in order to take them off.

Instead of varnished balls covered with glittering paper, which have the effect of convex glasses, there are rough balls selected, which throw sharp and dark shades.

The horizontal plate or disk in the center is kept fast by its own friction.

The attachment of the sun and moon will be readily understood.

In Fig. 1 is shown an elevation of the apparatus under an angle of forty-nine degrees.

A P designate the axis of the heavens. B B indicate the northern polar circle; C C, the northern tropical circle; and F F, the southern tropical circle. H H represent the horizon, held by two lugs, on which the relief of the relative regions, bordered by red blotting-paper, is to be seen. M indicates the momentary position of the moon; S, the same of the sun. The axis ends in a small sphere, which is adjustably held fast by the screw S c.

The apparent wandering of the sun in the midst of the fixed stars is due to the actual motion of the earth itself in making its revolutions. Therefore, if the sun culminates about twenty-three and a half degrees higher on the 21st of June than on the 21st of March, it is necessary that the earth must have gone down so much, and if the sun is apparently going upward during that time through the signs of the zodiac—the ram, the bull, and the twins—then the earth is going downward through the opposite signs—the balance, the scorpion, and the archer—in like manner. Always the motion of the sun is the reciprocal of the true and real motion of the earth.

My apparatus explains this and also the origin of the four seasons; that the earth in following the obliquity of the ecliptic rises and goes down inside of the apparatus.

Referring to Fig. 4, let D D be the equator of the heavens; S, the sun, represented by a lighted candle in the center of the apparatus. The arrows c c indicate the direction of the ecliptic.

If the earth is at B a sunbeam must fall perpendicularly on the equator. At the pole another sunbeam will be tangential; but in the position A the light strikes about twenty-three and a half degrees beyond the pole. The equator cannot be struck perpendicularly by the sunlight, but only the northern tropical circle. This rising and sinking is in direct connection with the apparent rising and sinking of the sun. The axis of the earth in proceeding on its course remains pointing in same direction at an angle of twenty-three and a half degrees with the ecliptic, to which are due the four seasons.

Fig. 5 shows the earth by a small sphere, which is bored through from one point to another on the equator, and from one tropical circle to the other, in order to follow better with the eyes and the stick the course of the light. This is better illustrated in Fig. 6.

In order that the earth may regulate her own course I proceed in the following manner: If a coloring-pencil is placed on the axis at the point where the earth rests, Fig. 10, this pencil would leave behind a line caused by the annual revolution of the earth. If this line is filled in sufficiently, and the pencil replaced by a steel pin, the latter must direct the earth exactly during its annual revolution. Fig. 7 shows this line.

The point B is represented as behind and A before the axis, and the arrows show the motion of the ball representing the earth upward and downward. From B to A is half a revolution, and from B to B a whole one.

The actual motion of the moon is accomplished in quite an analogous way. The orbit of the moon (represented by an extensible ring) can be put over the ecliptic, and then drawn tight under the characteristic angle to the ecliptic of five degrees and eight minutes.

The advancing of the moon's nodes is very easily demonstrated in this way, as also the conditions of the eclipses.

In Fig. 8, S' represents the sun; E, the earth; M, the moon. A S shows the direction of the orbit of the earth; B S, the direction of the orbit of the moon corresponding to the situation in 1876.

As the balls representing the earth and the moon are made conveniently small, no eclipse can occur in the position represented, as is readily seen from the shadows cast on the plane P P. At the node of both the orbits, where the earth and moon are to be found in the same line, eclipses occur.

For example, suppose the site of the city of Philadelphia to be marked with a pin on the earth, and turn the earth so that it is in the spring, midnight position. The sun must, by the continuous rotation of the earth, rise in the eastern point of this small horizon and disappear at the western point.

As the earth sinks during the summer twenty-three and a half degrees, then the sun must naturally appear at another point when the earth revolves around it and describes another arc. These arcs are represented by wires, and the removing of the rising and culmination points of the sun is a necessary consequence of the annual revolution of the earth.

In the same way can be demonstrated the different positions of the sun and moon above and below the horizon.

Like the apparent motions of the moon, the motions of the planets can also be shown by the apparatus.

The other real motions can also be represented. The sun, as a light for that purpose, is always in the center. If the ball which represents the earth is taken for the planet Venus, or for the planet Mercury, and the ball at the equator for the earth, the revolutions back and forth, and also the phases of the planet Venus, can be made visible.

Fig. 9 represents again, S, the sun; V, the planet Venus; E, the earth; and the planet Venus will be seen under the angle like a crescent as the morning star.

If the earth is put inside, and the planets Mars, Jupiter with his moons, and Saturn are set outside of the sphere, all motions and seasons may be shown easily. The last ones are dependent on the inclination to the orbit and the parallelism of the axis.

Fig. 10 represents the part at the equator, showing the various set-screws to secure the various parts together. The numbers I II III show different positions in which the devices may be placed.

Finally, in order to explain the precession of the equinoxes, a small ring is laid around the pole of the ecliptic. If that is made fast, and the horizontal disk be considered as the equator of the heavens and movable, and it be revolved contrary to the signs of the ecliptic under an angle of twenty-three and a half degrees, and cutting it always, then this precession is represented in a simple way.

A pendulum on every new position of the disk shows the direction of the axis of the heavens within twenty-five thousand years. The pendulum follows the motion of the little ring. The mutation is represented by a curved copper wire which is drawn through the apparatus.

Having thus described my invention, what I claim, and desire to secure by Letters Patent, is—

1. An orrery constructed and arranged to represent by shadows of objects placed on suitable parts of the instrument the position of the stars or heavenly bodies, substantially as described.

2. An orrery constructed and arranged to represent the position of the stars and other heavenly bodies by shadows of properly-shaped bodies placed thereon, the whole being supported on an axis and adapted to be placed in position to correspond with the latitude and longitude of the place at which the instrument is employed, substantially as described.

3. An orrery adapted to represent the position of the stars and other celestial bodies, consisting of a hollow spheroidal open-work frame having the models of the heavenly bodies to be represented supported thereon, the said models being adapted to indicate the forms and outlines of said heavenly bodies of constellations formed thereby, substantially as described.

In testimony that I claim the foregoing I have hereunto subscribed my name in the presence of two witnesses.

ADOLF MANG.

Witnesses:
    L. WASSMER, *London.*
    A. ISELE, *Baden.*